United States Patent [19]
Kim

[11] Patent Number: 5,856,857
[45] Date of Patent: Jan. 5, 1999

[54] DOMAIN DIVIDED LIQUID CRYSTAL DISPLAY PANELS HAVING ALTERNATELY RUBBED PIXEL AREAS AND METHODS OF FABRICATION THEREFOR

[75] Inventor: Hyun-dae Kim, Kyungki-do, Rep. of Korea

[73] Assignee: Samsung Electronics Co., Ltd., Suwon, Rep. of Korea

[21] Appl. No.: 808,320

[22] Filed: Feb. 28, 1997

[30] Foreign Application Priority Data

Feb. 28, 1996 [KR] Rep. of Korea .................... 1996-5053

[51] Int. Cl.[6] ........................ G02F 1/1337; G02F 1/141
[52] U.S. Cl. ........................ 349/129; 349/126; 349/136
[58] Field of Search .................................. 349/128, 129, 349/126, 136

[56] References Cited

U.S. PATENT DOCUMENTS

| 4,232,946 | 11/1980 | Gharadjehaghi et al. | 350/320 |
| 4,878,742 | 11/1989 | Ohkubo et al. | 350/347 |
| 5,473,455 | 12/1995 | Koike et al. | 359/76 |
| 5,657,102 | 8/1997 | Mizushima et al. | 349/129 |
| 5,666,178 | 9/1997 | Hirata et al. | 349/129 |

FOREIGN PATENT DOCUMENTS

| 04204818 A | 7/1992 | Japan . | |
| 95-29830 | 11/1995 | Rep. of Korea . | |
| 2 023 865 | 1/1990 | United Kingdom | 349/129 |

*Primary Examiner*—William L. Sikes
*Assistant Examiner*—Tiep H. Nguyen
*Attorney, Agent, or Firm*—Myers Bigel Sibley & Sajovec

[57] ABSTRACT

A panel for a liquid crystal display (LCD) includes a substrate having a plurality of pixel areas defined thereon. A first alignment layer is formed on the substrate, the first alignment layer providing a first pretilt angle for a liquid crystal material. A plurality of spaced apart second alignment regions is formed on the first alignment layer, the second alignment regions providing a second pretilt angle for the liquid crystal material, respective second alignment regions being separated by a portion of the first alignment layer such that a respective pixel area is covered by the first alignment region and partially covered by a second alignment region. Portions of the first alignment layer and the second alignment regions covering respective adjacent pixel areas have grooves formed therein which are substantially aligned along respective first and second directions. The first and second directions preferably are perpendicular. The pixel areas may be rectangular, and the portion of a respective pixel area covered by a second alignment region may include approximately one-half of the pixel area. The approximately one-half of the pixel area may include a rectangular portion of the pixel area. Preferably, the second pretilt angle is greater than the first pretilt angle.

13 Claims, 3 Drawing Sheets

DOMAIN DIVIDED LIQUID CRYSTAL DISPLAY PANELS HAVING ALTERNATELY RUBBED PIXEL AREAS AND METHODS OF FABRICATION THEREFOR

FIELD OF THE INVENTION

The present invention relates to liquid crystal display (LCD) devices and methods of fabrication therefor, in particular, to domain divided LCDs and methods of fabrication therefor.

BACKGROUND OF THE INVENTION

Generally, a twisted nematic (TN) LCD display has a viewing angle which is dependent upon orientations of molecules of the liquid crystal material sandwiched between the panels of the display. To provide wider viewing angles, a domain divided twisted nematic (DDTN) display has been proposed in which a single rubbing process may be used to form a panel of the display which when combined with a similar panel provides alternating twists for liquid crystal molecules of adjacent pixel areas.

As illustrated in FIGS. 1 and 2, a conventional LCD includes a thin-film transistor (TFT) substrate 10 opposed by a color filter substrate 20. Each pixel area defined on the substrate is divided into two regions, a first region covered by a first alignment layer 30a, 30b which provides a first pretilt angle for the liquid crystal material and a second region covered by a second alignment layer 32a, 32b which provides a second pretilt angle for the liquid crystal material, the second pretilt angle typically being greater than the first pretilt angle. The first and second alignment layers 30a, 32a of the TFT substrate 10 typically are rubbed in a first direction (indicated by the dotted arrows of FIGS. 1 and 2) to produce fine grooves in the first and second alignment layers 30a, 32a which are disposed along the first direction. The first and second alignment layers 30b, 32b of the color filter substrate 20 typically are rubbed in a second direction (indicated by the solid arrows of FIGS. 1 and 2) perpendicular to the first direction to produce fine grooves in the first and second alignment layers 30b, 32b of the color filter substrate 20 which are disposed along the second direction. To assemble the display, the TFT substrate 20 and the color filter substrate 20 are mounted in opposing relationship and aligned such that a portion of the TFT substrate 10 which is covered by the first alignment layer 30a is opposite a portion of the color filter substrate 20 which is covered by the second alignment layer 32b. Assuming the top of the page represents the top of the display, if the first and second directions are as indicated in FIG. 1, an "up-down" DDTN structure is provided which can produce a wider vertical viewing angle for the display. In contrast, if the first and second directions are as indicated in FIG. 2, a "left-right" DDTN structure is provided which can produce a wider horizontal viewing angle for the display.

The conventional DDTN structures described above can provide improved viewing angles over non-domain divided displays. However, the viewing angle improvement achieved is typically unbalanced, providing an increase viewing angle in only one direction.

SUMMARY OF THE INVENTION

In light of the foregoing, it is an object of the present invention to provide liquid crystal display (LCD) panels and methods of fabrication therefor which can provide increased viewing angles over conventional displays.

It is another object of the present invention to provide LCD panels and methods of fabrication therefore which can provide wider viewing angles in multiple directions.

These and other objects, features and advantages are provided according to the present invention by LCD panels and methods of fabrication therefor which provide an LCD panel which includes a first alignment layer providing a first pretilt angle, and a plurality of spaced apart second alignment regions providing a second pretilt angle formed on the first aligmnent layer which are separated by a portion of the first alignment layer such that a respective pixel area is covered by the first alignment region and partially covered by a second alignment region, wherein portions of the first alignment layer and the second alignment regions covering respective adjacent pixel areas of the substrate have grooves formed along respective first and second directions. Preferably, the pixel areas are rectangular, and the portion of a pixel area covered by the second alignment region is a rectangular area representing approximately one-half of the pixel area.

In particular, according to the present invention, a panel for a liquid crystal display (LCD) includes a substrate having a plurality of pixel areas defined thereon. A first alignment layer is formed on the substrate, the first alignment layer providing a first pretilt angle for a liquid crystal material. A plurality of spaced apart second alignment regions is formed on the first alignment layer, the second alignment regions providing a second pretilt angle for the liquid crystal material, respective second alignment regions being separated by a portion of the first aligmnent layer such that a respective pixel area is covered by the first alignment region and partially covered by a second aligmnent region. Portions of the first alignment layer and the second alignment regions covering respective adjacent pixel areas have grooves formed therein which are substantially aligned along respective first and second directions. The first and second directions preferably are perpendicular. The pixel areas may be rectangular, and the portion of a respective pixel area covered by a second alignment region may include approximately one-half of the pixel area. The approximately one-half of the pixel area may include a rectangular portion of the pixel area. Preferably, the second pretilt angle is greater than the first pretilt angle.

According to method aspects, a first alignment layer is formed on a surface of a substrate having a plurality of pixel areas defined thereon, the first alignment layer providing a first pretilt angle for a liquid crystal material. A plurality of spaced apart second alignment regions are formed on the first alignment layer opposite the surface of the substrate, the second alignment regions providing a second pretilt angle for the liquid crystal material, a respective pair of the spaced apart second alignment regions having an exposed portion of the first alignment layer disposed therebetween. Grooves are formed in portions of the first alignment layer and a second alignment region covering respective adjacent pixel areas of the substrate in respective first and second directions.

The spaced apart second alignment regions may be formed by forming a second alignment layer on the first alignment layer, the second alignment layer providing a second pretilt angle for the liquid crystal material. The second alignment layer may be patterned such that a portion of respective pixel area is partially covered by a second alignment region. The pixel areas preferably are rectangular, and the second alignment layer is patterned such that approximately one-half of a respective pixel area is covered by a second alignment region. The approximately one-half of a pixel area preferably comprises a rectangular portion of the pixel area.

The grooves may be formed by rubbing the second alignment regions and the exposed portions of the first alignment layer in a first direction. Selected pixels areas of the substrate are then covered with a masking material such that covered pixel areas are disposed adjacent uncovered pixel areas. The uncovered portions of the substrate are then rubbed in a second direction, preferably perpendicular to the first direction. The selected pixel areas may be covered by covering the substrate with a layer of masking material, and then patterning the layer of masking material to remove portions of the layer of masking material overlying selected pixel areas such that pixel areas covered by the masking material are disposed adjacent uncovered pixel areas. A panel for an LCD having an expanded viewing angle is thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
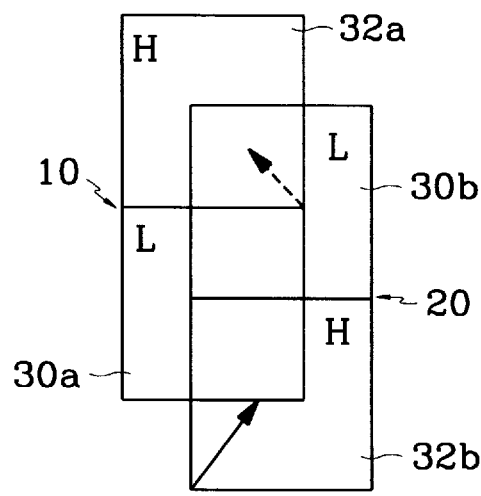
FIGS. 1–3 illustrate liquid crystal display (LCD) panel configurations according to the prior art.
Figure 2:
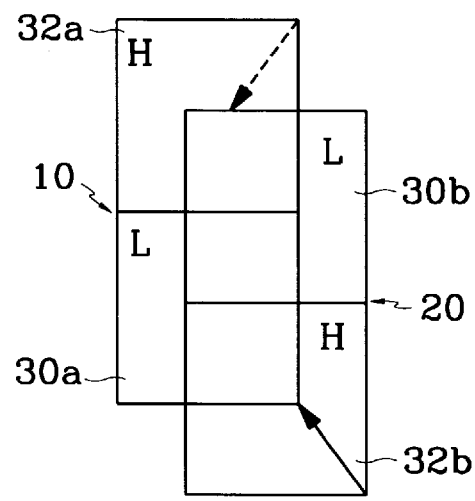
Figure 3:
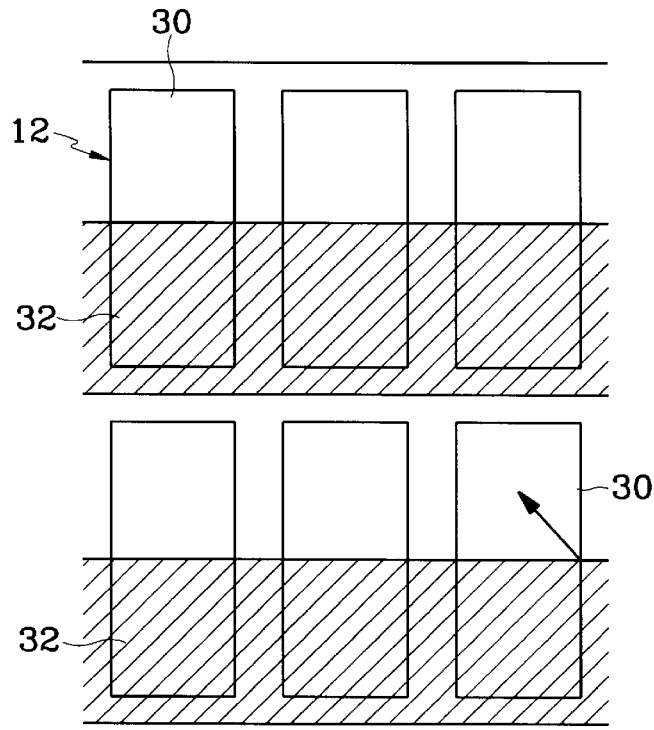

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity, and like numbers refer to like elements throughout.

Figure 4:
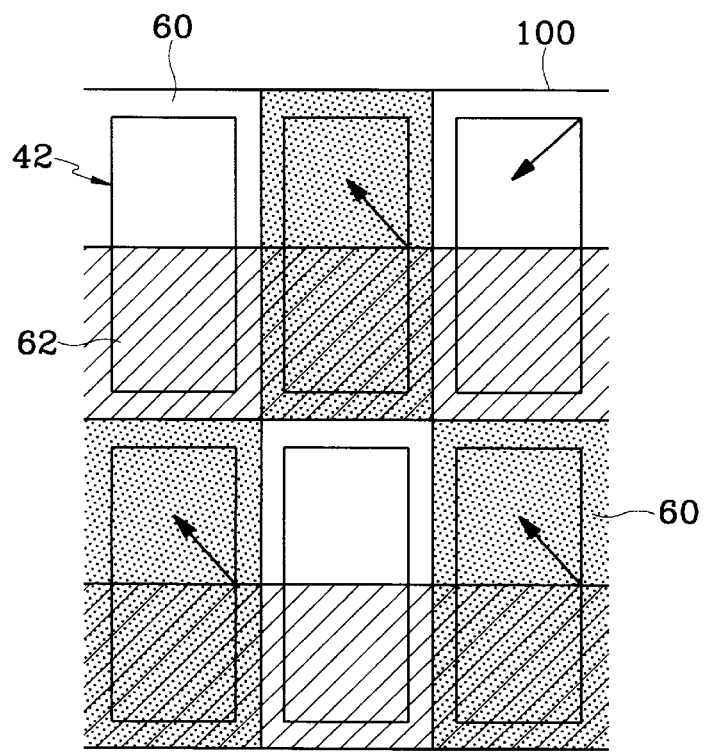
FIGS. 4–5 illustrate LCD panel configurations and methods of fabrication therefor according to the present invention.

Referring to FIG. 4, a substrate 100 has a plurality of pixel areas 42 defined thereon. A first alignment layer 60 is formed on the substrate 100. The first alignment layer 60 provides a first pretilt angle for a liquid crystal material used in the display formed from the substrate 100.

A second alignment layer is formed on the first alignment layer 60. The second alignment layer preferably provides a second pretilt angle for the liquid crystal material which is higher than the first pretilt angle. The second alignment layer is patterned to form a plurality of spaced apart second alignment regions 62, such that a portion of each pixel area 42 is covered by one of the second alignment regions 62. As shown, the pixel areas 42 are rectangular, and the portion of a pixel area 42 covered by a second alignment region 62 preferably is a rectangular portion occupying approximately one-half of the pixel area 42.

After formation of the second alignment regions 62, the second alignment regions 62 and the exposed portions of the first alignment layer 60 are then rubbed in a first direction (indicated by the arrows of FIG. 4). This rubbing produces a plurality of grooves in the second alignment regions 62 and the exposed portions of the first alignment layer 60, the grooves being disposed substantially along the direction of the arrows of FIG. 4.

Figure 5:
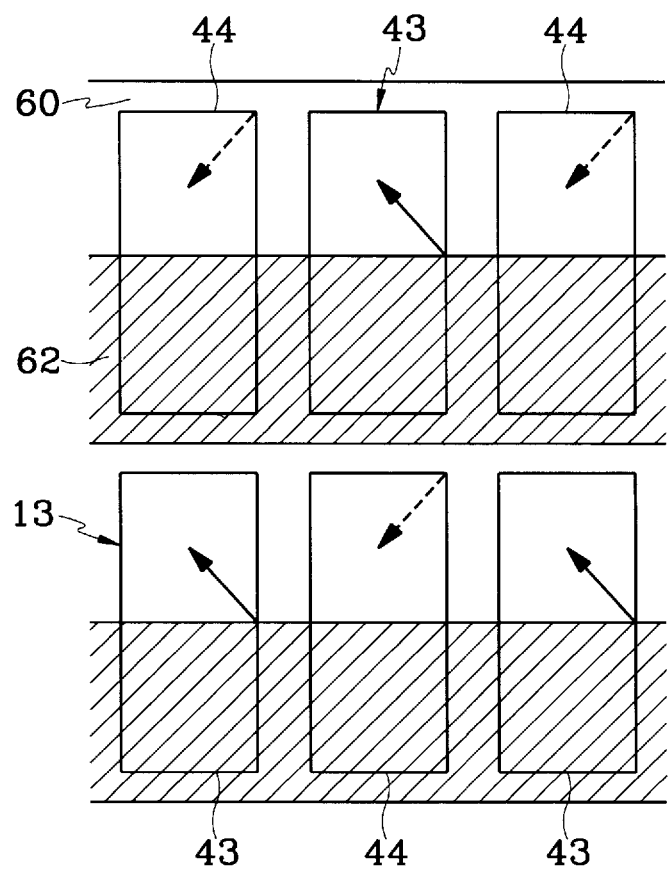

A layer of masking material is then formed on the substrate 100, covering the second alignment regions 62 and the exposed portions of the first alignment layer 60. The layer of masking material is then patterned to remove portions of the layer of masking material overlying selected pixel areas such that pixel areas 43 covered by the masking material are disposed adjacent uncovered pixel areas 44. The portions of the first alignment layer 60 and the second alignment regions 62 in the uncovered pixel areas 44 are then rubbed in a second direction (indicated by the dotted arrows of FIG. 5) which preferably is perpendicular to the first direction (indicated by the solid arrows of FIG. 5), producing a plurality of grooves in the portions of the first alignment layer 60 and the second alignment regions 62 within the uncovered pixel areas which are disposed substantially along the second direction. The remaining masking material may then be removed, leaving a pattern which adjacent pixels areas having grooves formed in the respective perpendicular first and second directions.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A panel for a liquid crystal display (LCD), comprising:
    a substrate having a plurality of pixel areas defined thereon;
    a first alignment layer on said substrate, said first alignment layer providing a first pretilt angle for a liquid crystal material;
    a plurality of spaced apart second alignment regions on said first alignment layer, said second alignment regions providing a second pretilt angle for said liquid crystal material, the respective second alignment regions being separated by a portion of said first alignment layer such that a respective one of the pixel areas is covered by said first alignment layer and partially covered by one of the second alignment regions;
    wherein portions of said first alignment layer and said second alignment regions covering the respective adjacent pixel areas have grooves formed therein which are substantially aligned along respective first and second directions for the respective adjacent pixel areas.

2. A panel according to claim 1, wherein said first and second directions are perpendicular.

3. A panel according to claim 2, wherein said pixel areas are rectangular.

4. A panel according to claim 3, wherein said respective one of the pixel areas covered by said one of the second alignment regions comprises approximately one-half of said respective one of said pixel areas.

5. A panel according to claim 4, wherein said approximately one-half of said pixel area comprises a rectangular portion of said pixel area.

6. A panel according to claim 1, wherein said second pretilt angle is greater than said first pretilt angle.

7. A method of forming a panel for a liquid crystal display, the method comprising the steps of:
    forming a first alignment layer on a surface of a substrate having a plurality of pixel areas defined thereon, the first alignment layer providing a first pretilt angle for a liquid crystal material;
    forming a plurality of spaced apart second alignment regions on the first alignment layer, the second alignment regions providing a second pretilt angle for the liquid crystal material, a respective pair of the spaced apart second alignment regions defining an exposed portion of the first alignment layer disposed therebetween; and forming grooves in portions of the first alignment layer and the second alignment regions covering pixel areas of the substrate in respective first and second directions for respective adjacent ones of the pixel areas;

wherein said step of forming a plurality of spaced apart second alignment regions comprises the steps of:

forming a second alignment layer on the first alignment layer, the second alignment layer providing a second pretilt angle for the liquid crystal material: and patterning the second alignment layer to form the plurality of spaced apart second alignment regions such that a portion of a respective one of the pixel areas is partially covered by one of the second alignment regions, and a portion of the first alignment layer is exposed between a respective pair of the second alignment regions.

8. A method according to claim 7, wherein said step of forming grooves comprises the steps of:

rubbing the second alignment regions and the exposed portions of the first alignment layer in a first direction;

covering selected ones of the pixel areas of the substrate with a masking material such that the covered pixel areas are disposed adjacent uncovered pixel areas;

rubbing the uncovered pixel areas in a second direction.

9. A method according to claim 8, wherein said step of covering selected pixel areas comprises the steps of:

covering the substrate with a layer of the masking material; and patterning the layer of the masking material to remove portions of the layer of the masking material overlying the uncovered pixel areas such that the selected pixel areas covered by the masking material are disposed adjacent the uncovered pixel areas.

10. A method according to claim 7, wherein the pixel areas are rectangular, and wherein said step of patterning comprises the step of patterning the second alignment layer such that approximately one-half of each one of the respective pixel area is covered by a second alignment region.

11. A method according to claim 10, wherein the one-half of a pixel area comprises a rectangular portion of the pixel area.

12. A method according to claim 7, wherein the first and second directions are perpendicular.

13. A method according to claim 12, wherein the second pretilt angle is greater than the first pretilt angle.

* * * * *